(12) United States Patent
Weingart et al.

(10) Patent No.: US 7,159,189 B2
(45) Date of Patent: Jan. 2, 2007

(54) METHOD AND SYSTEM FOR CONTROLLING CASCADED WINDOWS ON A GUI DESKTOP ON A COMPUTER

(75) Inventors: Barry S. Weingart, Los Angeles, CA (US); David B. Price, Glendale, CA (US)

(73) Assignee: Alphabase Systems, Inc., Los Angeles, CA (US)

( * ) Notice: Subject to any disclaimer, the term of this patent is extended or adjusted under 35 U.S.C. 154(b) by 0 days.

(21) Appl. No.: 10/865,988

(22) Filed: Jun. 10, 2004

(65) Prior Publication Data

US 2004/0255254 A1 Dec. 16, 2004

Related U.S. Application Data

(60) Provisional application No. 60/478,630, filed on Jun. 13, 2003.

(51) Int. Cl.
*G06F 3/00* (2006.01)
(52) U.S. Cl. ...................................... 715/799
(58) Field of Classification Search ......... 715/793–801
See application file for complete search history.

(56) References Cited

U.S. PATENT DOCUMENTS 5,841,436 A * 11/1998 Nakamura .................. 715/790
6,832,355 B1 * 12/2004 Duperrouzel et al. ....... 715/788
6,990,637 B1 * 1/2006 Anthony et al. ............ 715/851

OTHER PUBLICATIONS

Screen Dumps of Microsoft Word 2000 (pp. 1-4, 1999).*
Screen Dumps of Microsoft Outlook (pp. 1-3, 1999).*

* cited by examiner

*Primary Examiner*—Kristine Kincaid
*Assistant Examiner*—Lê Nguyen
(74) *Attorney, Agent, or Firm*—DLA Piper US LLP

(57) ABSTRACT

The present invention provides a method and system of maintaining and controlling the ordering and placement for display of individual GUI windows into groups or "decks" similar to a deck of playing cards on a desktop area of a computer display. The decks comprise collections of cascaded windows. The method and system control the decks such that the title bars of all windows of the deck are always simultaneously visible to the user no matter which window is selected as the active window. The act of moving the current top window back into a new position in the deck is defined as "shuffling" the windows. The method and system further provide auto-deck processes that automatically cascade defined applications, such as Internet Explorer windows, into a deck. In addition, the method and system may also include user-definable options as to the order of the shuffle, and includes the ability to drag the active window out of the deck and to drag any window into the deck. Also, the method and system may allow for the automatic resizing of all windows in a deck by just resizing the active window, and for a predetermined grouping of different applications into the same deck.

16 Claims, 21 Drawing Sheets

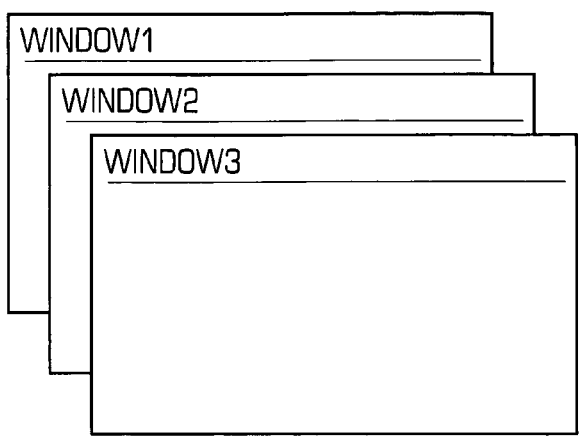
3 WINDOW DECK - INITIAL STATE
USER CLICKS MOUSE ON WINDOW2 TITLE BAR
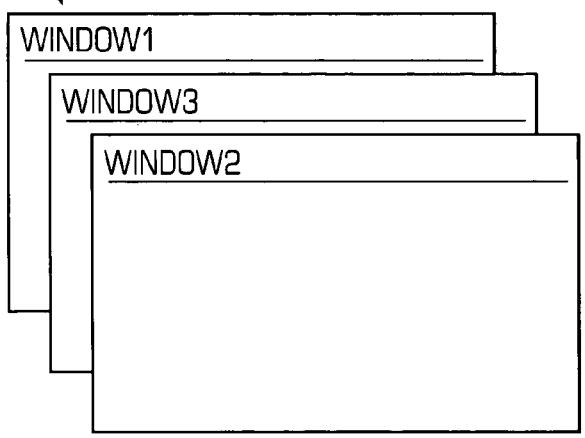
3 WINDOW DECK - STATE AFTER FIRST MOUSE CLICK
USER CLICKS MOUSE ON WINDOW1 TITLE BAR
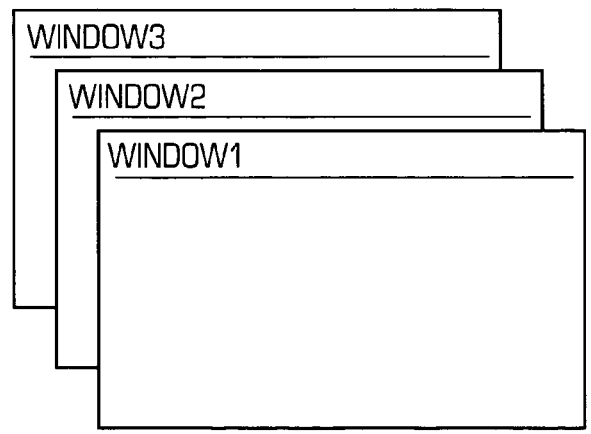
3 WINDOW DECK - AFTER SECOND MOUSE CLICK
FIG. 1

APPLICATION WINDOW PROPERTIES - ONE PER WINDOW DECKED OR NOT   TABLE #1

INFORMATION ABOUT A WINDOW OF A APPLICATION. THERE CAN BE MANY INSTANCES OF THESE CLASSES FOR ANY ONE PROCESS, DEPENDING ON HOW MANY TOP LEVEL WINDOWS THE APPLICATION OPENS.

| 20 | APPLICATION TYPE | TYPE OF APPLICATION (USES OWNED WINDOWS, ALL OTHERS) STANDARD AND THOSE THAT USE OWNED WINDOWS |
|---|---|---|
| 21 | WINDOW HANDLE | SYSTEM HANDLE TO THE SPECIFIC WINDOW |
| 22 | PROCESS ID | ID OF THE PROCESS WHOSE WINDOW THIS IS. USED TO LOOKUP PROCESS INFO FOR THIS WINDOW. |
| 23 | THREAD ID | ID OF THE THREAD THAT CREATED THE WINDOW. |
| 30 | ACTIVE TICKS | SYSTEM TICK COUNT OF THE LAST TIME THE WINDOW WAS MADE THE ACTIVE ONE |
| 31 | SHUFFLE SEQUENCE | IF THE WINDOW IS IN A DECK, THIS IS ITS CURRENT PLACEMENT ORDER IN THAT DECK |
| 32 | ADDED TICKS | SYSTEM TICK COUNT WHEN THE WINDOW WAS ADDED TO THE CURRENT DECK. |
| 33 | NEW TO DECK | TRUE WHEN THIS WINDOW IS ADDED TO A DECK. CONTROLS INITIAL SHUFFLE BEHAVIOR TEMP PREVENTS MEMBER FROM BEING SHUFFLED - STATE IS TOGGLED |
| 35 | DESCRIPTION | DESCRIPTION OF WINDOW USED IN DEBUG OUTPUT DISPLAY |
| 36 | VISIBLE FLAG | FLAG THAT INDICATES IF THE WINDOW IS VISIBLE |
| 37 | CAN BE SIZED | FLAG THAT INDICATES IF THIS WINDOW CAN BE SIZED WITH THE DECK OR NOT |
| 38 | LOCATION RECTANGLE | WINDOW'S CURRENT LOCATION RECTANGLE. |
| 40 | LAST DECK ID | ID OF THE DECK THE WINDOW WAS LAST REMOVED FROM. USED FOR MIN/RESTORE OPERATIONS |
| 41 | CAN BE DECKED | FLAG THAT INDICATES IF THE WINDOW CAN BE DECKED OR NOT |
| 42 | OVERRIDE ID | LINK TO SPECIFIC TITLE LINE OVERRIDE INFO FOR THIS WINDOW |
| 43 | DECK INFO | IF THE WINDOW IS IN A DECK, THIS IS A POINTER TO THE DECK INFORMATION PROPERTIES TABLE # |
| 44 | APPLICATION CTRL POINTER | LINK TO THE SHUFFLER'S APPLICATION CONTROLLER PROPERTIES TABLE # |

FIG. 2

PROPERTIES FOR STANDARD AND MDI DECKS TABLE #2

| | | |
|---|---|---|
| 50 | DECK TYPE | INDICATES IF DECK IS A STANDARD DECK OR MDI INTERNAL DECK |
| 51 | ID | UNIQUE ID FOR THIS DECK |
| 53 | NAME | PROGRAM GENERATED NAME FOR DECK. USED IN DEBUG OUTPUT DISPLAY |
| 54 | MOVE HANDLE | HANDLE OF THE WINDOW BEING USED TO MOVE/SIZE A DECK |
| 55 | MOVE TO RECTANGLE | THE DESTINATION RECTANGLE OF A DECK MOVE (WHERE USER DROPS MOVE WINDOW) |
| 57 | ACTIVE HANDLE | WINDOW HANDLE OF THE "ACTIVE" WINDOW OF THE DECK. (TOP OF Z_ORDER FOR DECK.) |
| 58 | ACTIVE TICKS | SYSTEM TICK COUNT OF WHEN DECK WAS LAST MADE ACTIVE |
| 59 | AUTO DECK ID | ID OF THE AUTO-DECK, IF ANY, RELATED TO THIS DECK |
| 60 | AUTO INSTANCE NO | IF DECK HAS A RELATED AUTO-DECK, THIS IS AN INSTANCE NO USED TO GENERATE UNIQUE DECK NAMES |
| 62 | ISMINIMIZED FLAG | FLAG THAT INDICATES IF DECK IS CURRENTLY MINIMIZED |
| 63 | ISMAXIMIZED FLAG | FLAG THAT INDICATES IF DECK'S ACTIVE WINDOW IS CURRENTLY MAXIMIZED |
| 64 | RESTORING FLAG | FLAG THAT INDICATES IF DECK IS CURRENTLY RESTORING FROM A MINIMIZED STATE |
| 65 | MINIMIZED TICKS | SYSTEM TICK COUNT AT THE START OF A DECK MINIMIZE OPERATION |
| 66 | SHUFFLE TICKS | SYSTEM TICK COUNT SET AT VARIOUS STAGES OF THE SHUFFLE OPERATION |
| 70 | HORIZONTAL ADJUST COUNT | PIXEL COUNT OF LEFT OFFSET TO USE WHEN CASCADING WINDOWS IN THE DECK |
| 71 | VERTICAL ADJUST COUNT | PIXEL COUNT OF TOP OFFSET TO USE WHEN CASCADING WINDOWS IN THE DECK |
| 72 | INSHUFFLE FLAG | FLAG THAT INDICATES IF DECK IS CURRENTLY IN A SHUFFLE OPERATION |
| 73 | ISVISIBLE FLAG | FLAG THAT INDICATES IF DECK IS CURRENTLY VISIBLE (USING VARIOUS CONDITIONS) |
| 74 | INMOVE FLAG | FLAG THAT INDICATES IF DECK IS CURRENTLY IN A MOVE OPERATION |
| 75 | CHECKEDGE FLAG | FLAG THAT INDICATES IF DECK POSITIONING DURING MOVE SHOULD BE CONSTRAINED BY DESKTOP BOUNDARIES |
| 76 | CANSLIDE FLAG | FLAG THAT INDICATES IF DECK CAN USE ANIMATION DURING VARIOUS OPERATIONS |
| 77 | ISHIDDEN FLAG | FLAG THAT INDICATES IF DECK IS CURRENTLY "HIDDEN". USUALLY ON ANOTHER "DESKTOP" |
| 78 | ADJUSTMOUSE FLAG | FLAG THAT INDICATES IF THE MOUSE POSITION SHOULD BE ADJUSTED AFTER A SHUFFLE OPERATION |
| 79 | ISTILED FLAG | FLAG THAT INDICATES IF DECK IS CURRENTLY IN A TILED STATE |
| 80 | ISCLOSING FLAG | FLAG THAT INDICATES THAT THE USER HAS REQUESTED THAT ALL WINDOWS IN THE DECK BE CLOSED |
| 82 | SHUFFLEORDER FLAG | DEFINES THE ORDER TO USE FOR SHUFFLING (ROUND-ROBIN OR DECK ORDER) |
| 83 | ACTIVEAPPLICATION LINKS | LIST OF POINTERS TO TABLE #1 INSTANCES OF WINDOWS CURRENTLY IN THE DECK |
| | DECKCTRL LINK | LINK TO THE CONTROLLER FOR THE SET OF DECKS THIS DECK BELONGS TO. (STANDARD OR MDI INTERNAL) |
| 85 | MDI PARENT ID | IF THE DECK IS A MDI INTERNAL DECK, THIS IS THE PROCESS ID OF THE PARENT PROCESS |

FIG. 3

PROGRAM SPECIFIC SETTINGS PROPERTIES TABLE #3

| | ID | UNIQUE ID |
|---|---|---|
| 100 | NAME | NAME, EXTENT OF PROGRAM |
| 101 | NOSIZE FLAG | FLAG THAT INDICATES IF WINDOWS OF THIS PROGRAM CAN BE SIZED WITH A DECK |
| 103 | IGNORESIBLINGS FLAG | FLAG THAT INDICATES THAT CERTAIN MESSAGES OF CHILD WINDOWS SHOULD BE HANDLED IN A SPECIAL WAY |
| 105 | NOHOOK FLAG | FLAG THAT INDICATES THAT THIS PROGRAM'S THREADS CAN OR CAN NOT BE HOOKED |
| 106 | NODECK FLAG | FLAG THAT INDICATES THAT WINDOWS OF THIS PROGRAM CAN OR CAN NOT BE DECKED |
| 107 | NOMDIDECK FLAG | FLAG THAT INDICATES IF MDI CHILD WINDOWS OF THIS PROGRAM CAN OR CAN NOT BE DECKED |
| 108 | NOESCAPE FLAG | FLAG THAT INDICATES IF AN ESCAPE CHAR CAN BE SENT TO WINDOWS OF THIS PROGRAM TO ACTIVATE THEM |
| 109 | USEACTIVATE FLAG | FLAG THAT INDICATES IF SPECIAL HANDLING NEEDS TO BE DONE FOR ACTIVATION MSGS IN WINDOWS OF THIS PROGRAM |
| 110 | CHECKVISIBILITY FLAG | FLAG THAT INDICATES IF SPECIAL CHECKING NEEDS TO BE DONE FOR VISIBLE STATE CHANGES IN THIS PROGRAM |
| 111 | NOOWNER FLAG | FLAG THAT INDICATES IF "OWNED" WINDOWS OF THIS PROGRAM CAN PARTICIPATE IN DECKING |
| 112 | ALLOWPOPUPS FLAG | FLAG THAT INDICATES IF POPUP (WS_POPUP) WINDOWS OF THIS PROGRAM CAN PARTICIPATE IN DECKING |
| 113 | FORCEPOSITION FLAG | FLAG THAT INDICATES IF WINDOWS MUST BE MOVED/DISPLAYED IN DECK EVEN WHEN POSITION HAS NOT CHANGED |
| 114 | APPLICATION TYPE | INDICATES IF PROGRAM IS OF THE "OWNER WINDOW" TYPE OR STANDARD APPLICATION TYPE OWNERS HAVE NO MSG AT CREATION SO WE MUST INSPECT ON A TIMER |
| 120 | | |
| 125 | OVERRIDECTRL | POINTS TO LIST OF TABLE #4 CONTROLLER FOR ANY WINDOW SPECIFIC SETTINGS RELATED TO THIS PROGRAM |

FIG. 4

WINDOW SPECIFIC SETTINGS PROPERTIES FOR TITLE BAR MATCHING WINDOWS TABLE #4

| | ID | UNIQUE ID |
|---|---|---|
| 140 | OVERRIDE TYPE | INDICATES IF THIS OVERRIDE PERTAINS TO POPUP, STANDARD, OR ANY WINDOW CREATED BY THE RELATED PROGRAM |
| 141 | PROGRAM ID | THE ID OF THE CPGMINFO INSTANCE THIS OVERRIDE PERTAINS TO |
| 143 | TITLE | TEXT PHRASE TO SEARCH FOR IN CREATED WINDOWS TITLES TO DETERMINE IF THIS OVERRIDE PERTAINS TO IT |
| 145 | NOSIZE FLAG | OVERRIDE OF PROGRAM LEVEL SETTING FOR THIS FLAG (SEE ABOVE 103) |
| 146 | NODECK FLAG | OVERRIDE OF PROGRAM LEVEL SETTING FOR THIS FLAG (SEE ABOVE 107) |
| 147 | NOESCAPE FLAG | OVERRIDE OF PROGRAM LEVEL SETTING FOR THIS FLAG (SEE ABOVE 109) |
| 148 | FORCEPOSITION FLAG | OVERRIDE OF PROGRAM LEVEL SETTING FOR THIS FLAG (SEE ABOVE 114) |
| 149 | | |

FIG. 5

| | AUTO DECK PROPERTIES - TABLE #5 | |
|---|---|---|
| 160 | ID | UNIQUE ID |
| 161 | NAME | THE SHUFFLER GENERATED NAME FOR THIS DECK. USED IN DEBUG OUTPUT DISPLAY |
| 163 | APPLICATION NAME | NAME.EXTENT OF THE PROGRAM THIS INFORMATION PERTAINS TO |
| 164 | USEDEFAULT ADJUST FLAG | FLAG THAT INDICATES IF THE GLOBAL LEFT, TOP ADJUST SETTINGS SHOULD BE USED OR THE ONES LOCAL TO THIS CLASS |
| 166 | HORIZONTAL OFFSET | THE OFFSET FROM THE LEFT TO USE WHEN CASCADING WINDOWS IN DECKS OF THIS TYPE |
| 168 | VERTICAL OFFSET | THE OFFSET FROM THE TOP TO USE WHEN CASCADING WINDOWS IN DECKS OF THIS TYPE |
| 170 | ONLY FLAG | FLAG THAT INDICATES IF DECKS OF THIS TYPE LIMIT MEMBERSHIP TO WINDOWS OF THIS PROGRAM |
| 172 | ANIMATION | FLAG THAT INDICATES IF ANIMATION CAN BE USED IN VARIOUS OPERATIONS ON DECKS OF THIS TYPE |
| 174 | SHUFFLE ORDER | INDICATES THE ORDER (ROUND-ROBIN, DECK ORDER) TO BE USED WHEN SHUFFLING DECKS OF THIS TYPE |

FIG. 6

| | PROCESS PROPERTIES 1 PER PROCESS - TABLE #6 | |
|---|---|---|
| 190 | PROCESS ID | THE SYSTEM'S ID FOR THIS PROCESS |
| 191 | PROCESS HANDLE | OPEN HANDLE TO THIS PROCESS |
| 193 | NAME | NAME.EXTENT OF THE PROCESS |
| 195 | FILE SPECIFICATION | FILE SPECIFICATION TO THE EXE OF THE PROCESS |
| 196 | DESCRIPTION | THE SHUFFLER GENERATED DESCRIPTION OF PROCESS USED IN DEBUG OUTPUT DISPLAY |
| 197 | APPLICATION TYPE | INDICATOR IF PROCESS IS STANDARD OR ONE THAT USES OWNED WINDOWS |
| 199 | PROGRAM ID | ID OF CPGMINFO RELATED TO THIS PROCESS IF THE USER HAS ESTABLISHED PROGRAM SPECIFIC SETTINGS |
| 200 | AUTODECK ID | ID OF CAUTODECK RELATED TO THIS PROCESS IF THE USER HAS ESTABLISHED AUTO-DECK SETTINGS FOR THIS PROGRAM |
| 202 | AUTOMDIDECK ID | ID OF CAUTODECK FOR MDI INTERNAL RELATED TO THIS PROCESS IF THE USER HAS ESTABLISHED MDI DECK SETTINGS |
| 203 | ISMDI FLAG | FLAG THAT INDICATES IF THIS PROCESS IS A MDI PROCESS OR NOT. |
| 204 | MDICLIENT HANDLE | IF PROCESS IS A MDI, THIS HOLDS THE HANDLE TO THE MDI CLIENT WINDOW FOR THIS PROCESS |

FIG. 7

| | THREAD PROPERTIES - 1 PER THREAD TABLE #7 | |
|---|---|---|
| 210 | THREAD ID | THE SYSTEM'S ID FOR THIS THREAD |
| 211 | GETMSGHOOKED FLAG | FLAG THAT INDICATES IF THE GET MESSAGE HOOK HAS BEEN SET FOR THIS THREAD |
| 212 | SENDMSGHOOKED FLAG | FLAG THAT INDICATES IF THE SEND MESSAGE HOOK HAS BEEN SET FOR THIS THREAD |
| 215 | MOUSEMSGHOOKED FLAG | FLAG THAT INDICATES IF THE MOUSE MESSAGE HOOK HAS BEEN SET FOR THIS THREAD |
| 216 | GETMSGHOOK HANDLE | HANDLE TO THE GET MESSAGE HOOK, IF ANY |
| 218 | SENDMSGHOOK HANDLE | HANDLE TO THE SEND MESSAGE HOOK, IF ANY |
| 219 | MOUSEMSGHOOK HANDLE | HANDLE TO THE MOUSE MESSAGE HOOK, IF ANY |
| 222 | DESCRIPTION | THE SHUFFLER GENERATED DESCRIPTION USED IN DEBUG OUTPUT DISPLAY |
| 223 | APPLICATION COUNTER | NUMBER OF WINDOWS CREATED BY THIS THREAD CURRENTLY BEING MANAGED |

FIG. 8

| | MDI APPLICATION PROPERTIES 1 PER MDI APPLICATION TABLE #8 | |
|---|---|---|
| 230 | ID | UNIQUE ID |
| 231 | PARENT APPLICATION ID | PROCID OF PARENT APPLICATION IN NORMAL CPROCINFO LIST |
| 233 | MDI CLIENT HANDLE | HANDLE TO THE MDI CLIENT WINDOW |
| 235 | MAIN WINDOW HANDLE | HANDLE TO THE MAIN WINDOW OF THE PROCESS (CLIENTHWND'S PARENT WINDOW) |
| 236 | CURRECT | SIZE RECTANGLE FOR THE CLIENTHWND WINDOW |

FIG. 9

GLOBAL USER SETTABLE PROPERTIES TABLE #9

| | | |
|---|---|---|
| 250 | HORIZONTAL ADJUST | OFFSET FROM LEFT WHEN CASCADING WINDOWS IN A DECK |
| 251 | VERTICAL ADJUST | OFFSET FROM TOP WHEN CASCADING WINDOWS IN A DECK |
| 254 | CANHIDEICONS FLAG | FLAG THAT INDICATES IF THE USER WANTS TO BE ABLE TO HIDE DESKTOP ICONS OR NOT |
| 255 | AUTO ADD DISTANCE | NUMBER OF PIXELS USED TO DEFINE THE RADIUS OF A DROP ZONE FROM THE TOP/LEFT CORNER OF ACTIVE DECK WINDOW |
| 258 | LIMIT DRAG FLAG | FLAG THAT INDICATES THAT DRAGGING A DECK SHOULD BE CONSTRAINED TO THE DESKTOP |
| 260 | MDI LIMIT DRAG FLAG | FLAG THAT INDICATES IF DRAGGING AN INTERNAL MDI DECK SHOULD BE LIMITED TO THE MDI CLIENT WINDOW RECTANGLE |
| 261 | MDI AUTO SIZE FLAG | FLAG THAT INDICATES IF WINDOWS IN AN INTERNAL MDI DECK SHOULD BE SIZED WHEN THE MDI CLIENT IS SIZED |
| 262 | DECK MDI FLAG | FLAG THAT INDICATES IF THE SHUFFLER SHOULD ALLOW INTERNAL MDI DECKS OR NOT |
| 264 | ANIMATE SHUFFLE FLAG | FLAG THAT INDICATES IF DECK SHUFFLES SHOULD BE ANIMATED OR NOT |
| 265 | ANIMATE MOVE FLAG | FLAG THAT INDICATES IF DECK MOVES SHOULD BE ANIMATED OR NOT |
| 266 | ANIMATE ADD FLAG | FLAG THAT INDICATES IF ADDING WINDOWS TO DECKS SHOULD BE ANIMATED OR NOT |
| 270 | STEP COUNT | THE NUMBER OF STEPS TO USE WHEN ANIMATING DECK OPERATIONS |
| 272 | DECK MULTIPLES FLAG | FLAG THAT INDICATES IF MULTIPLE INSTANCES OF THE SAME PROGRAM SHOULD BE AUTOMATICALLY DECKED OR NOT |
| 273 | DROP ON CREATE FLAG | FLAG THAT INDICATES IF A NEWLY CREATED WINDOW SHOULD BE TREATED AS IF IT WAS DRAGGED/DROPPED THERE |
| 275 | DRAG TOP FLAG | FLAG THAT INDICATES IF THE WINDOW BEING DRAGGED REPRESENTS THE TOP OR BOTTOM OF THE DECK POSITION |
| 277 | AUTOSTART | FLAG THAT INDICATES IF THE SHUFFLER SHOULD START WHEN WINDOWS STARTS |
| 278 | SHUFFLE ORDER | INDICATES IF DECKS SHOULD BE SHUFFLED IN A ROUND-ROBIN FASHION OR BASED ON WINDOW ADD SEQUENCE |
| 280 | INISPEC | FILE SPECIFICATION OF FILE TO READ/WRITE SETTINGS TO |

FIG. 10

| | CLIENT DLL PROPERTIES TABLE #10 | |
|---|---|---|
| 300 | WINDOW HANDLE | WINDOW POINTER TO THIS WINDOW STRUCTURE |
| 301 | MDICLIENT HANDLE | POINTER IF WINDOW IS MDI |
| 302 | ACTIVE FLAG | SET IF WINDOW IS THE ACTIVE WINDOW IN A DECK |
| 303 | DECK ID | IF SET WINDOW IS IN A DECK |
| 304 | MOVESIZE FLAG | IF SET WINDOW IS CURRENTLY BEING MOVED OR SIZED |
| 305 | IGNORE SIBLINGS FLAG | IF SET SPECIAL CASE FOR SKINNED APPLICATIONS THAT USE MULTIPLE WINDOW SETS PER WINDOW |
| 306 | USES ESCAPE | IF SET WINDOW USES ESC TO EXIT |
| 307 | LAST NON CLIENT AREA HIT | TRACKS WHERE IN THE WINDOW THE MOUSE WAS AT WHEN IT WAS CLICKED |
| 308 | ISVISIBLE FLAG | IF SET WINDOW IS VISIBLE |
| 309 | RESTORING FLAG | SET WHILE WINDOW IS RESTORING |
| 310 | USE ACTIVATE FLAG | TRUE FOR WINDOWS THAT DON'T GET SHELL ACTIVATIONS |

FIG. 11

| MSG NO. | REF IN FIG #S | SOURCE | MESSAGE |
|---|---|---|---|
| 1. | 20,21 | SHUFFLER | SHUFFLER_ADDED_TO_DECK |
| 2. | 20 | SHUFFLER | SHUFFLER_REMOVED_FROM DECK |
| 3. | 20 | SHUFFLER | SHUFFLER_REMOVE_MENU |
| 4. | 19, DLL | SHUFFLER | SHUFFLER_MAKE_WINDOW_ACTIVE |
| 5. | 21 | SHUFFLER | SHUFFLER_ADD_OWNED_WINDOW_ |
| 6. | 21 | SHUFFLER | SHUFFLER_IGNORE_SIBLINGS |
| 7. | 21 | SHUFFLER | SHUFFLER_NO_ESCAPE |
| 8. | 21 | SHUFFLER | SHUFFLER_ADD_MDI_WINDOW |
| 9. | 21 | SHUFFLER | SHUFFLER_ADD_APP_WINDOW |
| 10. | 19 | SHUFFLER | SHUFFLER_RESTORING_WINDOW |
| 11. | 21 | SHUFFLER | SHUFFLER_USE_ACTIVATE |
| 12. |  | SHUFFLER | SHUFFLER_MENU_CLOSE_DECK |
| 13. |  | SHUFFLER | SHUFFLER_MENU_TILE_DECK |
| 14. |  | SHUFFLER | SHUFFLER_MENU_CASCADE_DECK |
| 15. | 21 | WINDOWS | HSHELL_WINDOWACTIVATED |
| 16. | 21 | WINDOWS | HSHELL_WINDOWCREATED |
| 17. | 19,20 | WINDOWS | WM_LBUTTONUP |
| 18. | 19 | WINDOWS | WM_SYSCOMMAND / SC_RESTORE |
| 19. |  | WINDOWS | WM_MDICASCADE |
| 20. |  | WINDOWS | WM_MDITILE |
| 21. |  | WINDOWS | WM_MDIDESTROY |
| 22. | 19,23 | WINDOWS | WM_SIZE |
| 23. | 19,23 | WINDOWS | WM_MOVE |
| 24. | 21 | WINDOWS | WM_ACTIVATE |
| 25. | DLL | WINDOWS | WM_ENTERSIZEMOVE |
| 26. | 23 | WINDOWS | WM_EXITSIZEMOVE |
| 27. | 21 | WINDOWS | WM_MDIACTIVATE |
| 28. | 21 | WINDOWS | WM_MOUSEACTIVATE |
| 29. | 19 | WINDOWS | WM_SYSCOMMAND/SC_MINIMIZE |
| 30. |  | WINDOWS | WM_DESTROY |
| 31. | DLL | WINDOWS | WM_INITMENUPOPUP |
| 32. | DLL | WINDOWS | WM_NCLBUTTONDOWN |

FIG. 12

METHOD AND SYSTEM FOR CONTROLLING CASCADED WINDOWS ON A GUI DESKTOP ON A COMPUTER

PRIORITY

This application claims the benefit of priority, pursuant to §35 USC 119(e), to U.S. provisional patent application Ser. No. 60/478,630, filed Jun. 13, 2003 which is incorporated herein by reference.

FIELD OF INVENTION

This invention relates generally to a GUI based computers and more particularly to a method and system for managing cascaded window arrangements in way that continually displays each window in the cascaded set of windows on a desktop display no matter which window is selected as active. The invention provides a set of extensible methods of making disparate applications within a given operating system environment behave in a manner that is consistent with the foregoing.

BACKGROUND OF THE INVENTION

Current Graphical User Interface ("GUI") based operating systems ("OS") deploy various methods for allowing users to organize various application windows on their desktops. The current organizational techniques feature a number of basic window arrangements such as tiling, cascading and free form placement both within a single application and across multiple applications. It is desirable for these applications to be running simultaneously within the OS in a manner that allows the user to easily move or switch from one to another. None of these current applications provide a method for cascading a set of windows such that at least a portion of the windows are concurrently visible on the desktop display so as to maintain a continuously viewable organization as different windows in the cascade are activated.

The advantage of a cascaded window set is that all of the windows are viewable on the desktop without taking up a lot of desktop real estate. The disadvantage to prior approaches to cascading is that as soon as any window located behind the top window in a cascade is selected, it obscures the other windows in the cascade. Operating systems allow applications to "hook" into existing applications so that the existing applications can be augmented or controlled. The invention utilizes this technique in a novel and unobvious way to achieve its goal of providing a display that enables a plurality of application vendors to be cascaded so they are visible on the display.

SUMMARY OF THE INVENTION

The present invention provides a method and system of maintaining and controlling the ordering and placement for display of individual GUI windows into groups or "decks" similar to a deck of playing cards on a desktop area of a computer display. The decks comprise collections of cascaded windows. These decks are controlled such that the title bar of all of the windows of the deck are always simultaneously visible to the user no matter which window is selected as the active window. The act of moving the current top window back into a new position in the deck is defined as "shuffling" the windows. Further, the invention provides auto-deck processes that automatically cascade defined applications, such as Internet Explorer windows, into a deck. In addition, the invention features user-definable options as to the order of the shuffle, and includes the ability to drag the active window out of the deck and to drag any window into the deck. Also the invention allows for the automatic resizing of all windows in a deck by just resizing the active window. Further the invention allows for a pre-determined grouping of different applications into the same deck.

The invention results in improved PC desktop display real estate usage while at the same time making it easier and quicker for users to access disparate windows displayed on the desktop.

According to one aspect of the present invention, a computer-implemented method is provided for managing a plurality of windows displayed on a computer. The method includes arranging the plurality of windows into a deck; and causing at least a portion of each window within the deck to be displayed regardless of which window in the deck is active.

According to another aspect of the present invention, a computer-readable medium having computer-executable instructions for performing a method for managing a plurality of windows displayed on a computer is provided. The method includes arranging the plurality of windows into a deck; and causing at least a portion of each window within the deck to be displayed regardless of which window in the deck is active.

According to another aspect of the present invention, a data processing system for use on a computer is provided. The system includes cascade logic for arranging a plurality of windows into a deck; and display logic for causing at least a portion of each window within the deck to be displayed regardless of which window in the deck is active.

These and other features, advantages, and objects of the invention will become apparent by reference to the following specification and by reference to the following drawings.

BRIEF DESCRIPTION OF THE DRAWINGS

FIG. 1 is a diagrammatic pictorial view of an example of the shuffling process of the invention for three GUI windows in a deck.

FIG. 2 is a table showing exemplary application window property data structures indicating one instance per window on the desktop whether decked or not.

FIG. 3 is a table showing exemplary data structures for standard and MDI decks indicating one instance for each active deck on the desktop.

FIG. 4 is a table showing exemplary program specific data structures indicating one for each program specified in the initialization file (INI file).

FIG. 5 is a table of exemplary data structures that describe structures used to identify specific windows on the desktop by a character match in their title bar so that special processing can be applied to that particular window.

FIG. 6 is a table of exemplary data structures for applications that are to be auto-decked.

FIG. 7 is a table of exemplary data structures for each process running on the desktop with a top level window.

FIG. 8 is a table of exemplary data structures for each thread running on the desktop with a top level window.

FIG. 9 is a table showing an exemplary MDI application data structure that holds the window handle of the MDI client window of an MDI application, one per MDI program instance.

FIG. 10 is a table of exemplary data structures describing global user settable parameters of the invention.

FIG. 11 is a table of exemplary data structures for describing the flags used for each client window being controlled by the invention.

FIG. 12 is an exemplary list of windows messages that are managed by the invention. The first column is a reference to each message number that is charted in FIGS. 13–17. The next column is a reference to the main logic flow chart shown in the figures. The next column indicates the source of the message, and the last column is the message name.

DETAILED DESCRIPTION OF THE EMBODIMENTS

Figure 13:
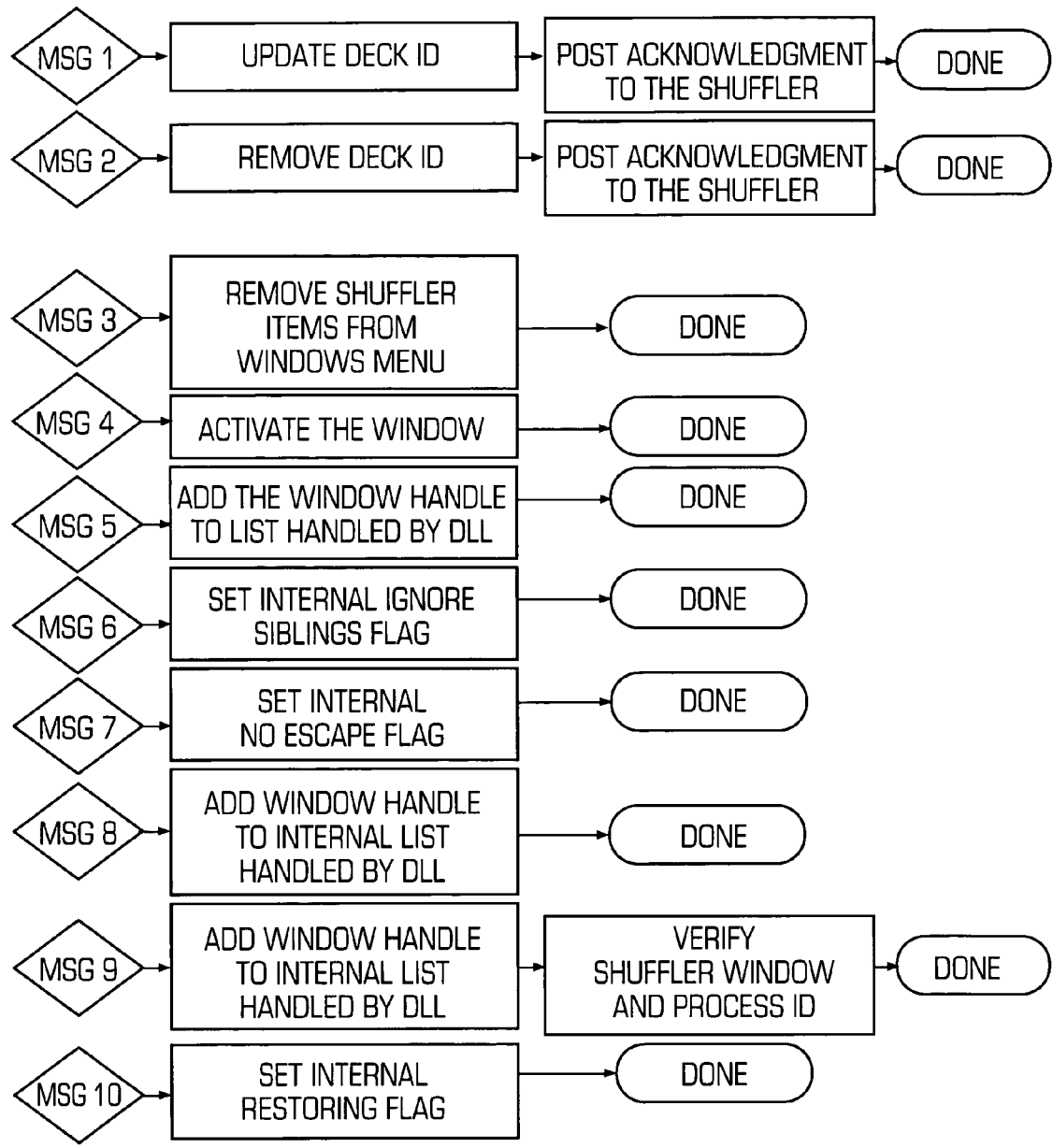
FIGS. 13–17 illustrate the basic flow that takes place for each message listed in FIG. 12.
Figure 14:
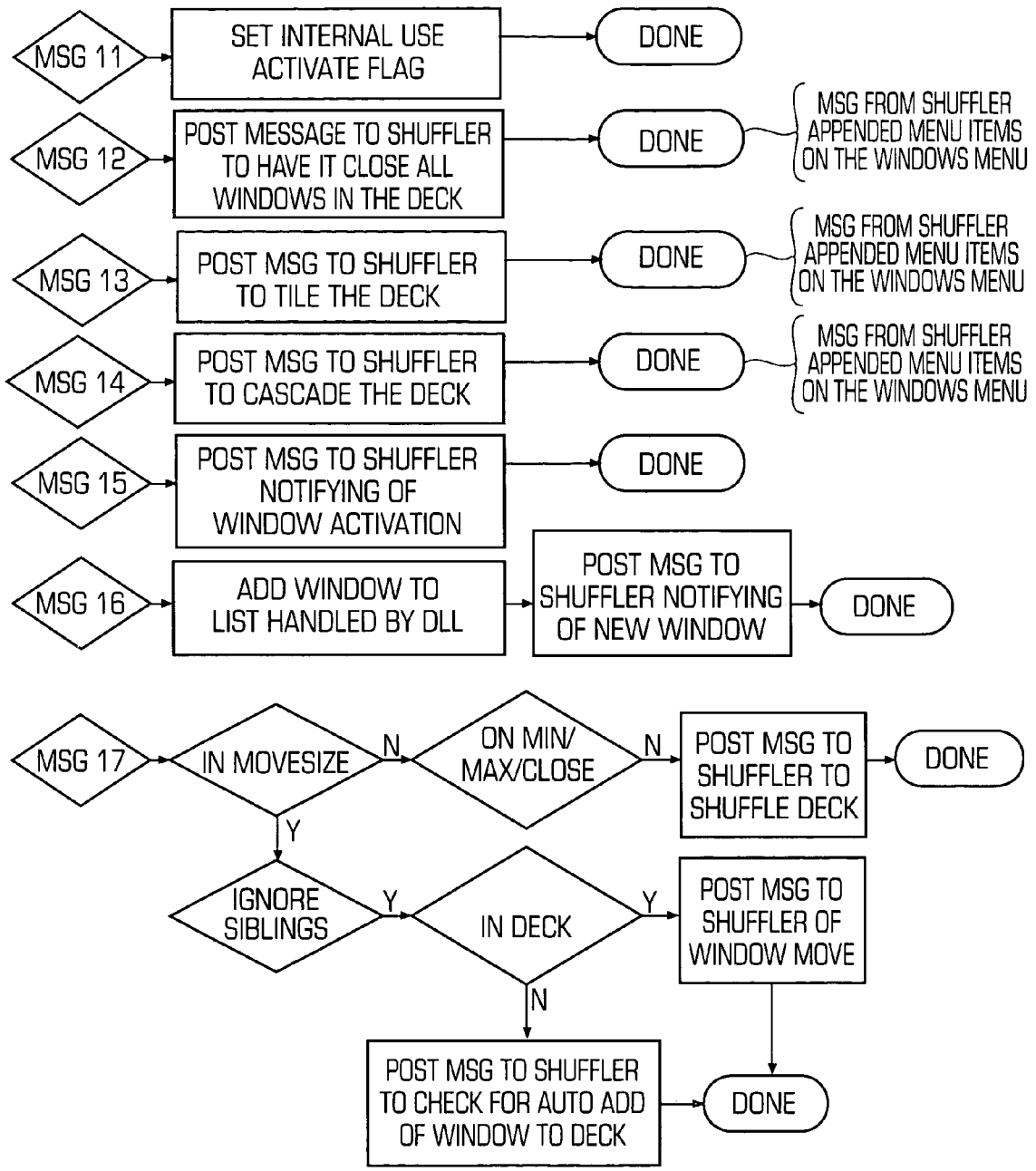
Figure 15:
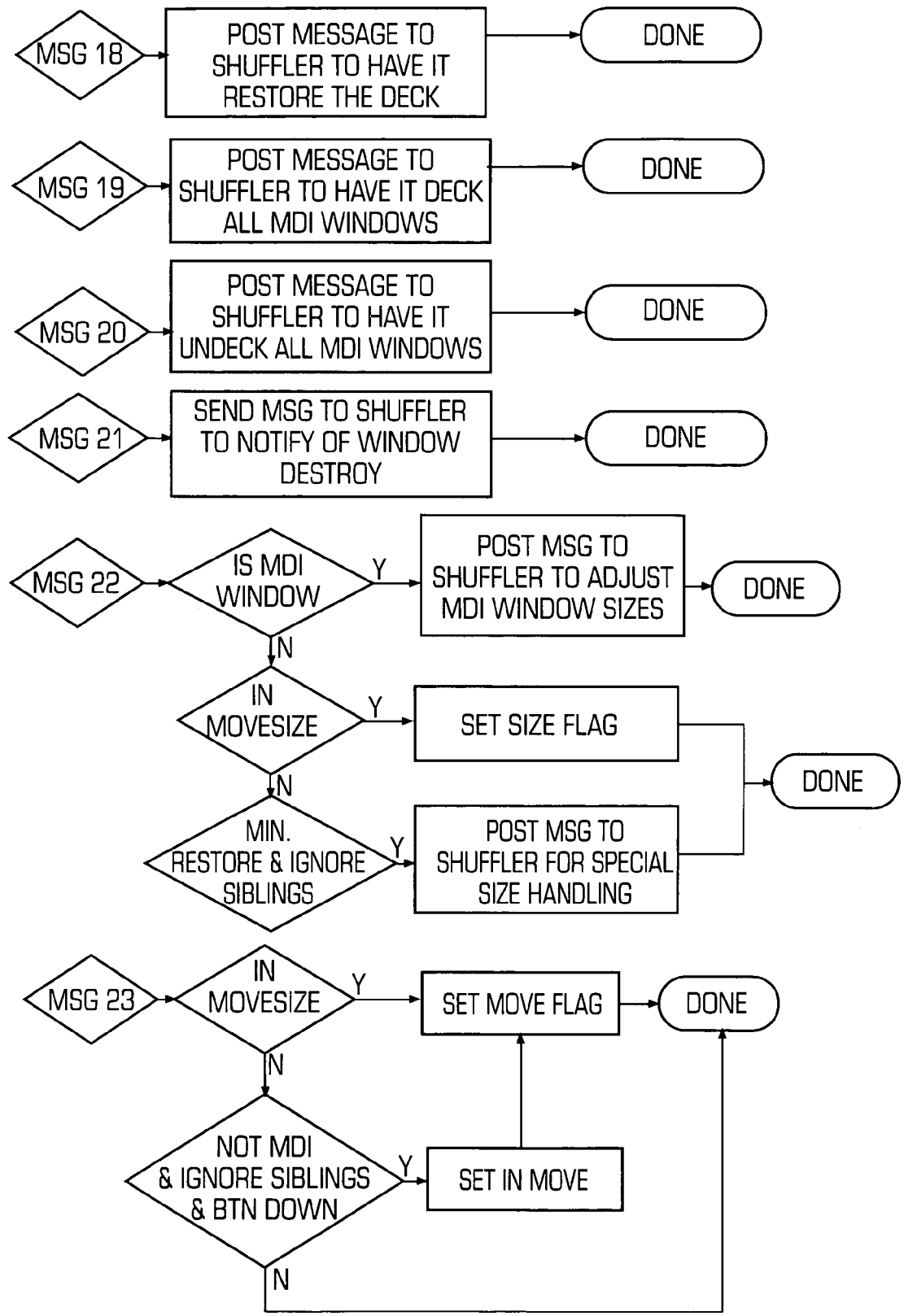
Figure 16:
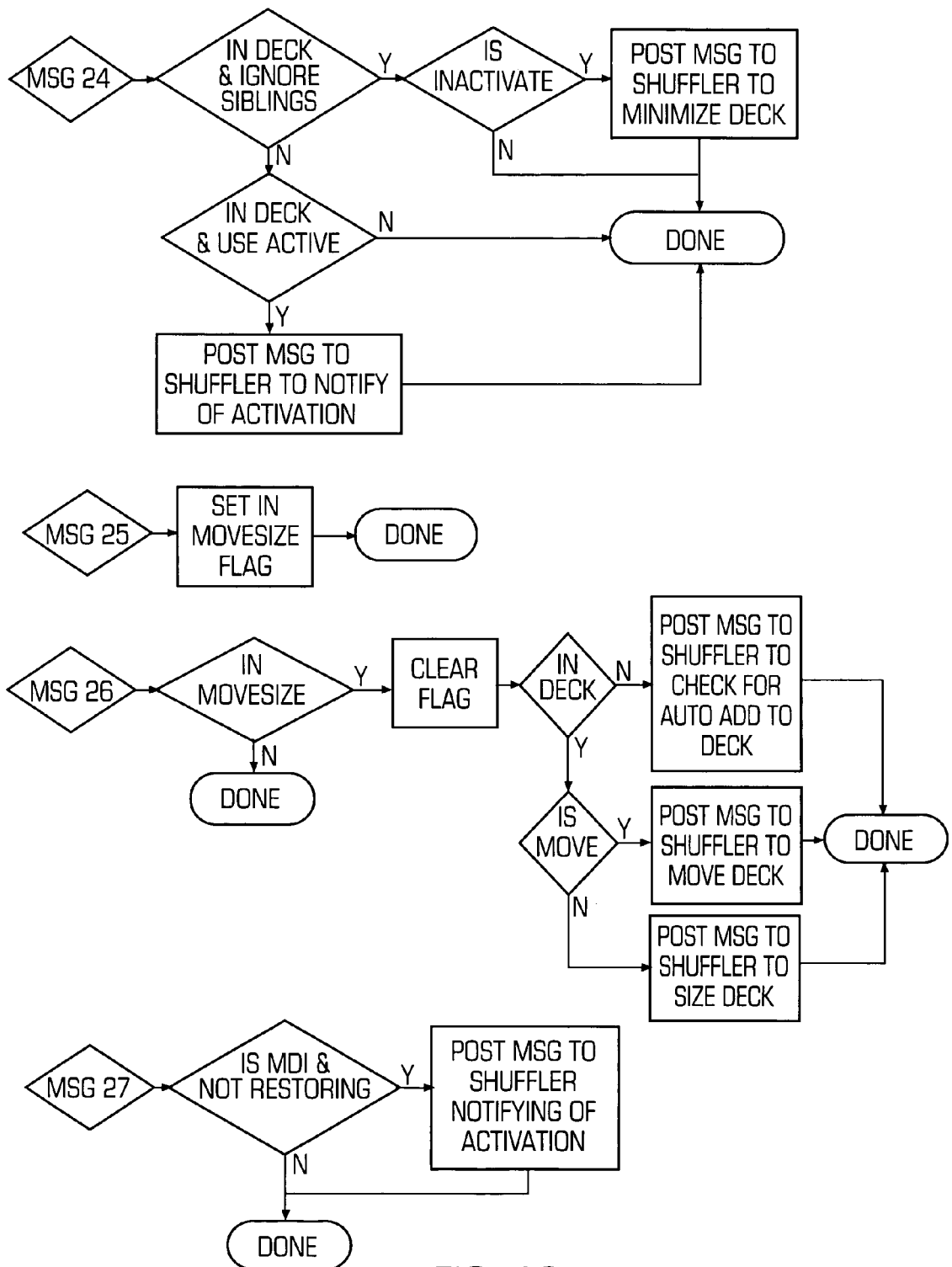
Figure 17:
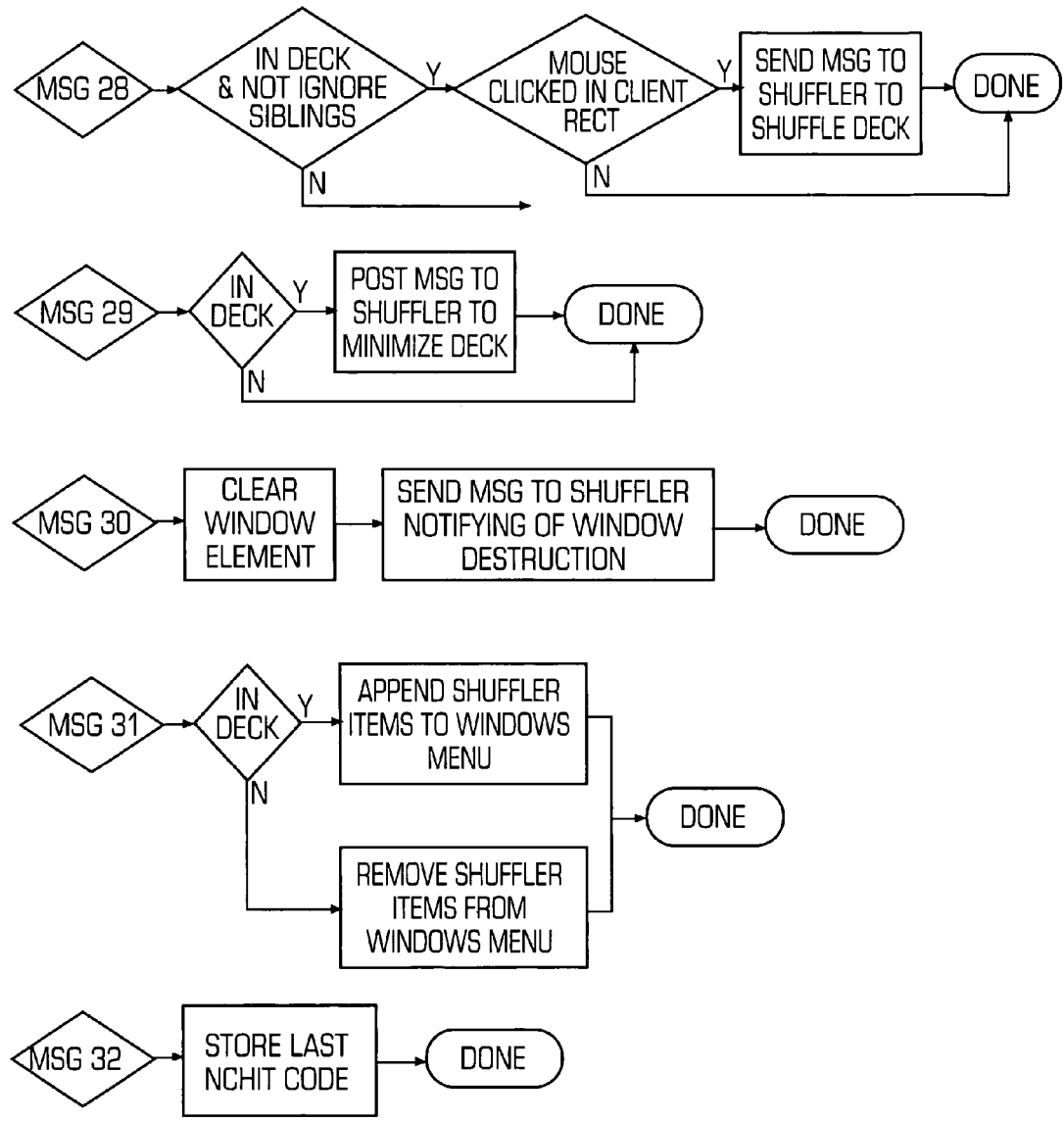

The present invention will now be described in detail with reference to the drawings, which are provided as illustrative examples of the invention so as to enable those skilled in the art to practice the invention. The present invention may be implemented using software, hardware, and/or firmware or any combination thereof, as would be apparent to those of ordinary skill in the art. The preferred embodiment of the present invention will be described herein with reference to an exemplary implementation with the Microsoft Windows™ Operating System(s). However, the present invention is not limited to this exemplary implementation, but can be practiced in any GUI based computer system.

As will be described in more detail, the invention provides a "shuffle" process and system that includes a method of controlling the order and placement of GUI windows on a computer PC desktop where a group of application windows is placed in a deck such that their title bars are visible at all times. Any window in the deck can be selected and brought to the front of the deck by clicking the mouse on its title bar, any exposed area of that window, or using a keyboard shortcut.

The window that is replaced as the active window in the deck is shuffled into another position in the deck as defined by a setup option to be either first-in-first-out order; or a round robin order where only the window that is clicked is shuffled with the windows below it. Window placements within the deck may be according to settable horizontal and vertical offsets and the invention includes the ability to "animate" the shuffling of the decks with settable on/off and speed of the animation.

A window may be removed from a deck by dragging the active window away from the deck. This automatically removes that window from the deck. A deck may be moved (dragged) around the display screen by dragging the title bars of any of the highest inactive window in the deck. This will cause the whole deck to be moved around the screen. In one embodiment, the deck can be split by grabbing the window at the split point and pulling that window and the windows below it in the deck away.

Windows may become part of a deck by dragging a window onto the deck so that the new window's title bar is placed within a settable defined pixel count of the current active window of that deck. In one embodiment, decks can be "decked" into other decks forming one larger deck by dragging the highest inactive window in the deck and dropping it on the target deck similar to adding a single window into a deck. Also, specific applications may be predefined to be part of an auto deck such that any instance created of such specified application automatically gets placed and positioned into the deck.

In one embodiment, the shuffle process employs special settable methods to make various "non-typical" window relationships compatible to the general capabilities. These include "Ignore Siblings" which causes sibling windows to not be shuffled; "No Resize" which inhibits window resizing for the specified application; "No Escape" for programs that use ESC to close to prohibit accidental closing; "Use Activation" a special case for programs that require the shuffler process to respond to windows that do not receive activation messages; "Check Visibility" which is used to handle multiple desktop programs correctly, primarily explorer; "Uses Owned Windows" for applications that create separate windows that they own that require shuffling implemented through a timer thread that checks for these new windows; "Allow Pop-ups" to be decked used in iE, for example, to allow download windows to be decked (WS_POPUP affected windows), and "Must Position" for applications that do not adhere to standard windows positioning commands which forces the display to adjust to the proper Z-order.

The invention also can handle MDI or "Multiple Document Interface" applications such that all the windows within an MDI application are controlled by the shuffler process; clicking on windows-cascade causes the windows to be decked, and resizing the main window automatically resizes the MDI windows (an option).

For purposes of example the Microsoft Windows™ Operating System(s) are used in the implementation examples and flow charts. It will be appreciated, however, that the invention is applicable to any of the existing GUI based operating systems.

In one embodiment, the shuffler process of the invention includes three main operational modules:
1—An executable or EXE which runs in its own program space and communicates back and forth with a DLL.
2—A dynamic link library or DLL which is dynamically loaded into existing applications that have top level windows on the desktop.
3—A setup program, a separate program that is used to customize the various properties and operational parameters of the invention. This program maintains XML files and sends a message to the EXE whenever it updates said XML files.

When a set of windows is cascaded together by the invention, this group of windows is described as being in a "deck". The foremost (top) window in the deck is referred to as the active window. Any given application can be preset in the invention so that as new windows or instances of the application are started they are automatically added to an existing deck of that application. This is described as an auto-deck process. Auto-decks may be grouped together so that multiple applications can be automatically added to the same deck on the desktop. The invention also provides the ability to deck all applications on a desktop into one deck with one mouse click.

Further, another feature of the invention is the "multiple desktop aware" functionality. According to this feature, when software creates multiple desktops within the GUI, the shuffle process respects the sanctity of each desktop when making all its auto-deck decisions.

An example of the operation of the invention can be viewed in FIG. 1, which shows three cascaded windows in a deck on a desktop display and the manner in which the deck may be shuffled to rearrange the deck by clicking a mouse on the title bars. The system and method of the present invention track and control various attributes and properties during this process. These properties are shown and discussed in the figures and tables below.

Table #1 of FIG. 2 contains examples of internal processing table properties that may be tracked for each window open in an application within the GUI. There can be many instances of these classes for any single process, dependent on how many top level windows the application opens.

Table #2 of FIG. 3 contains examples of internal processing table properties that are tracked for each Deck (both standard and MDI) that is currently managed within the GUI.

Table #3 of FIG. 4 contains examples of control table properties that are available for each different application (only if required) that changes that specific applications processing logic from the standard logic normally employed by the invention.

Table #4 of FIG. 5 contains examples of control table properties that are available for a specific window defined by that Window's title bar string as matching criteria. For example, features such as no resizing, no decking can be then applied to a specific window within an application.

Table #5 of FIG. 6 contains examples of control table properties that are available for a specific application to modify its behavior to be different from the default behavior as defined in Table #9 of FIG. 10.

Table #6 of FIG. 7 contains exemplary data structures for each process running on the desktop with a top level window. And Table #7 of FIG. 8 contains exemplary data structures for each thread running on the desktop with a top level window.

Table #8 of FIG. 9 shows an exemplary MDI application data structure that holds the window handle of the MDI client window of an MDI application, one per MDI program instance.

Table #9 of FIG. 10 contains exemplary data structures describing global user settable parameters of the invention. And Table #12 of FIG. 11 contains exemplary data structures for describing the flags used for each client window being controlled by the invention.

Table #10 of FIG. 11 is an example of a properties table that may be associated with each attached DLL linked to a given Window. Various flags are updated from the main processing program into this table so the DLL has local access to them.

FIG. 12 is a table containing messages that may be employed by both the invention as well as the Windows Operating System to control the logic flow of the invention. FIGS. 13–17 detail each message and the logic employed by the invention for each message. The text within each message describes each message.

Figure 18:
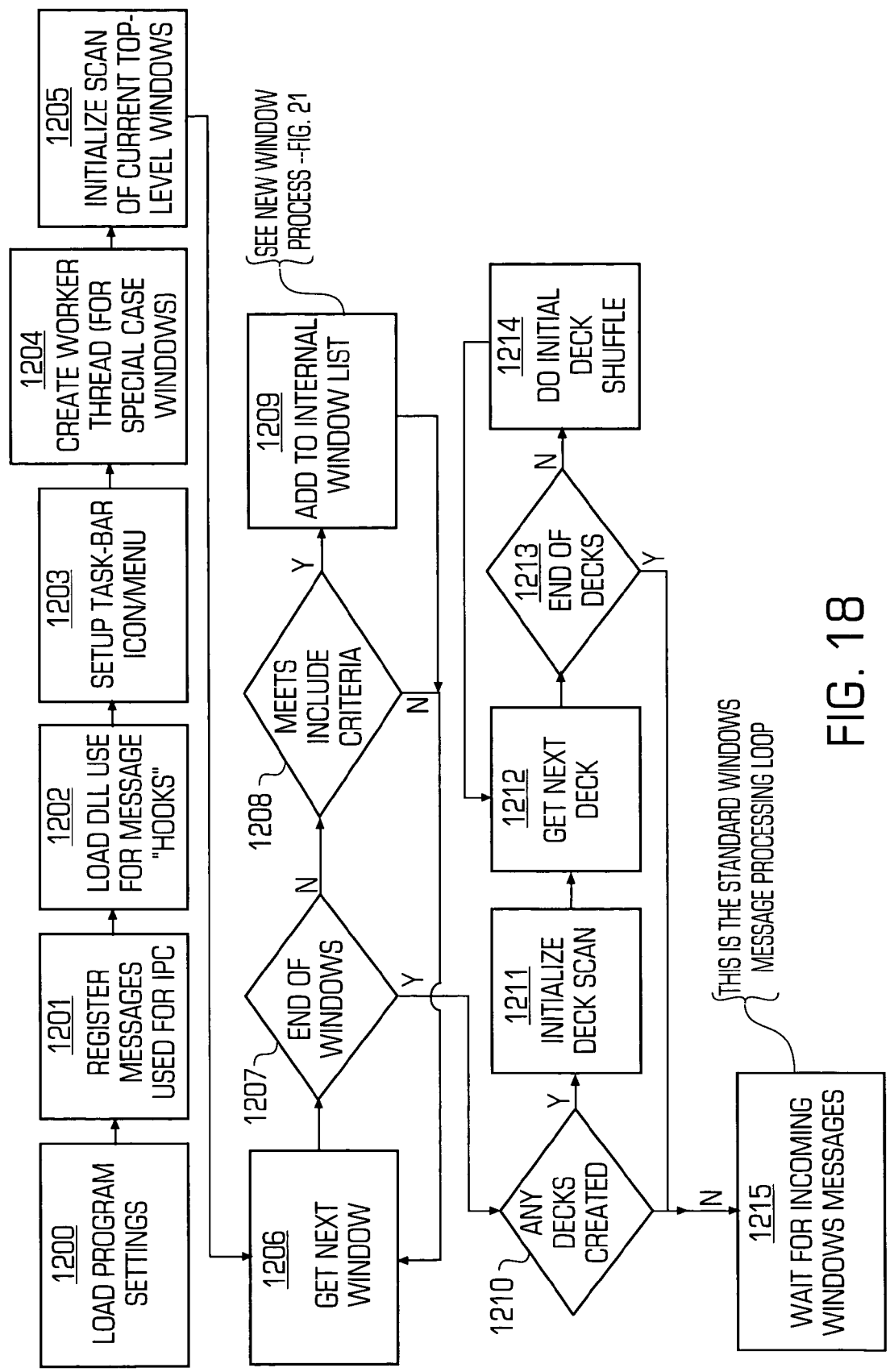
FIG. 18 is an exemplary flow chart that details an initialization process of the invention.

The present invention operates by hooking into a GUI based operating system at the individual application and thread level for each of the top level windows present on the desktop. The flowchart of FIG. 18 illustrates this startup process. As shown, step 1200 initializes the programs main settings at startup. Step 1201 registers the invention's inter program communication (IPC) messages required to operate between the EXE and DLL. Next, step 1202 loads the DLL. Step 1203 sets up a task bar entry, which is used by the users to make settings changes and exit the program. Step 1204 creates a worker thread that is used for special case applications as well as any MDI applications that might exist.

Figure 19:
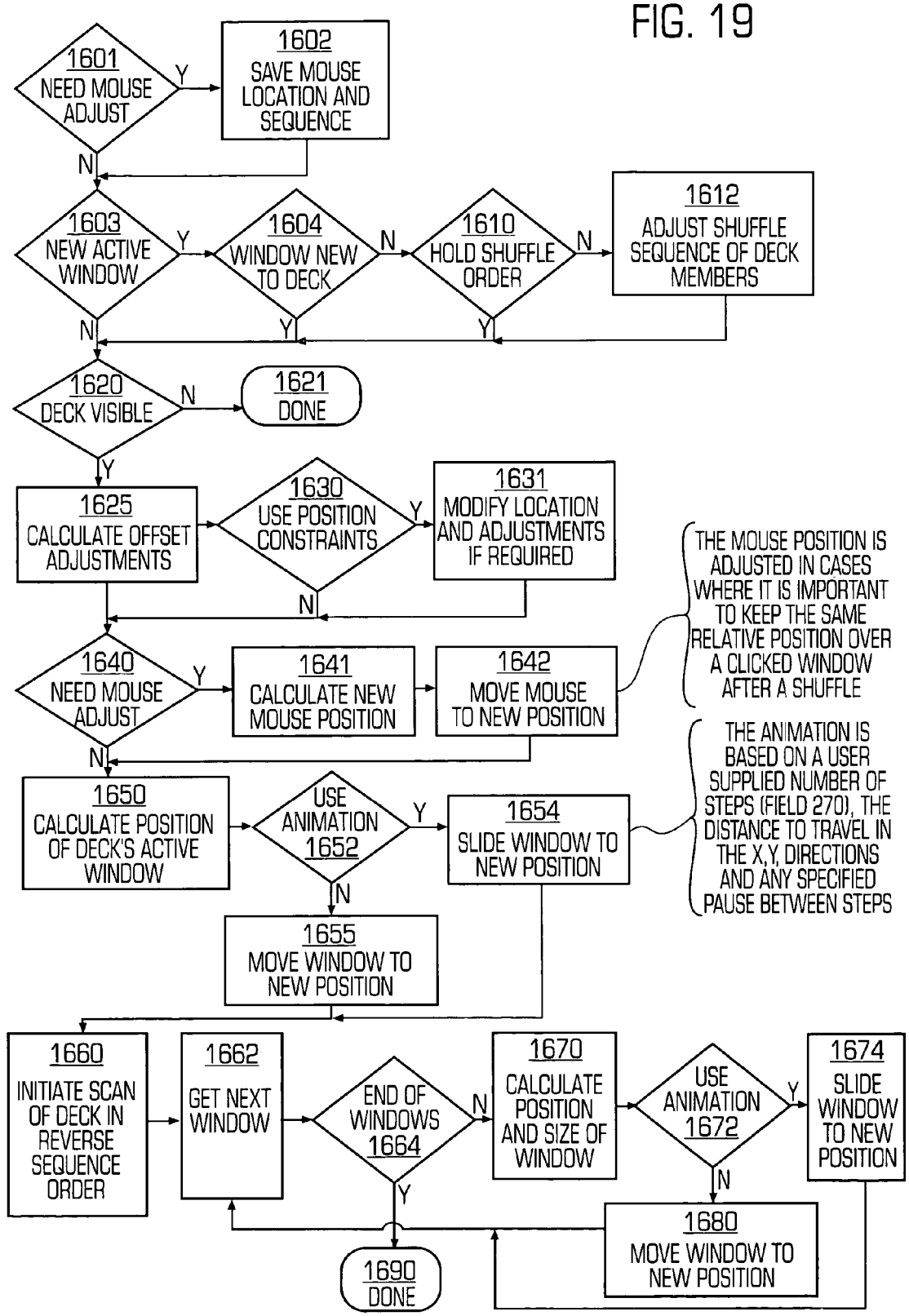
FIG. 19 is an exemplary flow chart that details an actual deck shuffling process of the invention.

Step 1205 leading into step 1206 begins a scan for top level windows. Once a window passes the criteria of being a window capable of cascading, then the new window process, which is described below, is called. The loop continues via steps 1207 through 1209 until all top level windows currently on the desktop are processed. At this point step 1210 determines if any auto-decks were created by the previous routines. If there are decks that were created, then steps 1211 through 1214 are executed to perform the actual placement of each of the deck's windows into the cascaded arrangement. This process is shown in FIG. 19 as will be covered next. Once the process of FIG. 18 is completed, the startup of the initial invention process is complete and any further processing is initiated by user interaction with the GUI desktop as described below.

FIG. 19 shows the flow of a process that results in the actual shuffling process of each cascaded deck. Step 1601 first determines if the current mouse position needs to be saved. This is due to the possibility that a user clicked on an active area of the window he was activating (such as a link on an browser window) expecting a secondary action to take place. If this is the case, step 1602 saves the location information. Then after the shuffle has taken place and before that area is processed, the window would have been moved and, therefore, needs to be adjusted to compensate for the movement. Next, step 1603 determines if there is a new active window in the deck (step 1604). If not, then step 1610 determines if the shuffle order needs to be adjusted, in which case step 1612 adjusts the sequence of the windows (members) in the deck This adjustment is caused by another window being clicked on in the deck requiring it to be the new active window.

Next, step 1620 determines if the deck is actually visible on the desktop. If this is not the case then the process is done (step 1621). Otherwise, step 1625 is executed to calculate all the new adjustment offsets for each of the windows in the deck. Step 1630 determines if field 258 or 260 (Table #9, shown in FIG. 10) of the window are set, and if so, then the offsets are compared to the limits of the desktop and modified to maintain the deck position within the desktop (step 1631). This provides another feature of the invention, i.e., the selectable ability to limit the dragging of any deck off the desktop.

Next, steps 1640 through 1642 determine if a new mouse position is required for this shuffle. In this case, the mouse is moved to the new position. This is determined by whether the mouse click occurred on the title bar of the window or not. The new position is required if the click was not on the title bar.

Next, step 1650 calculates the new position of the active window. Then step 1652 checks field 264 (Table #9, shown in FIG. 10), or field 172 (Table #6, shown in FIG. 7) if this is an auto-deck to determine whether or not to use an animation feature to do the actual shuffling of the invention. The animation feature causes the movement of the window (Step 1654) to be stepped through a series of position movements or steps defined in field 270 (Table #9, shown in FIG. 10), causing the appearance that the window is animating its shuffle. This feature provides a user with a discernable visual cue as to what happens when the user clicks on a window in a deck. If no animation is requested, the step 1655 executes the direct new position of the window.

Next, the remaining windows in the deck may be repositioned in reverse order so that the sequence in the deck is consistent with a properly cascaded look and feel based on the new order of the windows in the deck. This is accomplished by steps 1660 to 1680 using similar logic to that by which the first window was moved in steps 1650–1655.

When all of the windows in the deck have been moved to their new positions, then this process is completed (step 1690).

Figure 21:
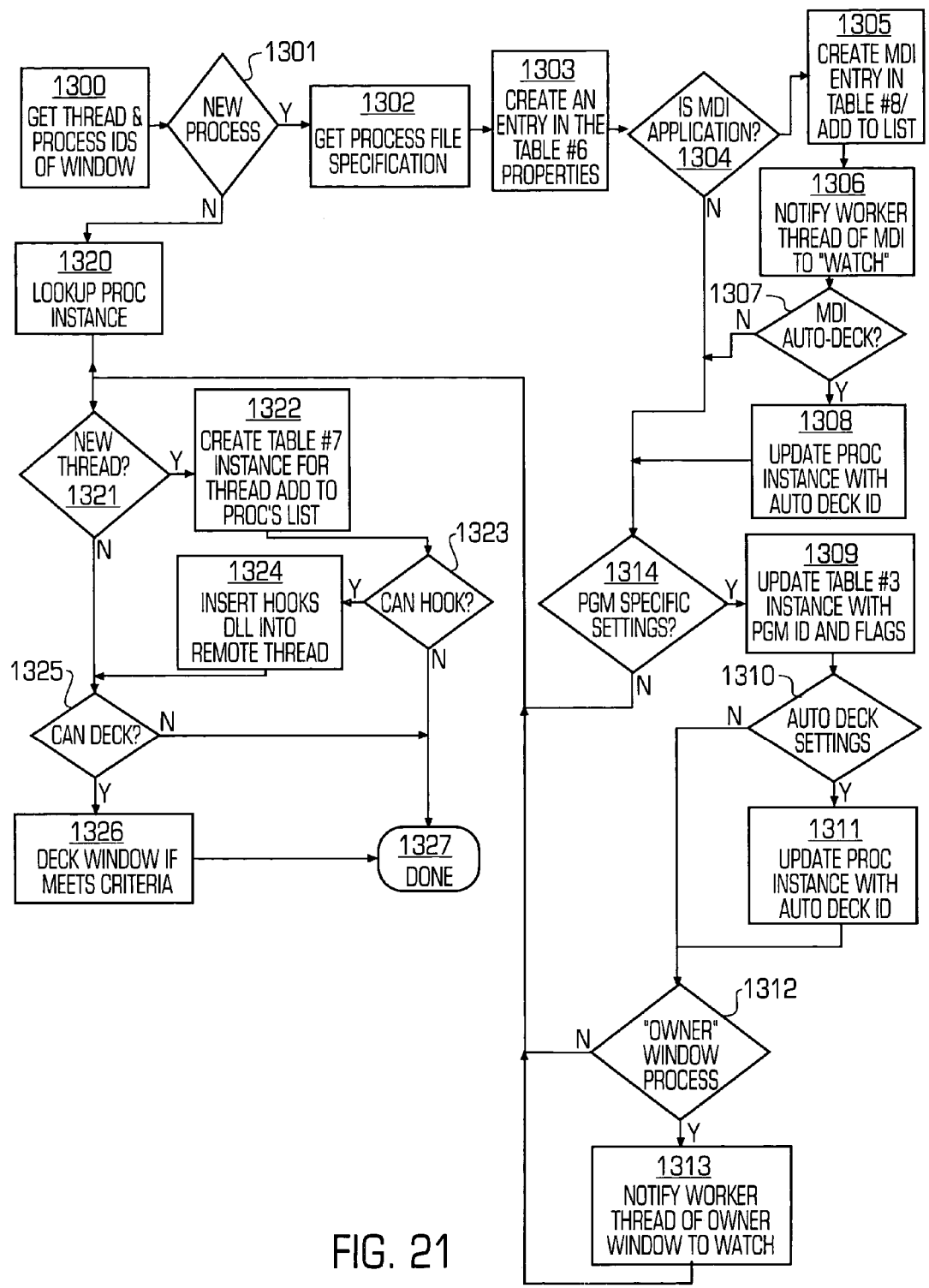
FIG. 21 is an exemplary flow chart that describes the process that takes place in the invention whenever a new window is detected on the desktop.

FIG. 21 shows the process that takes place whenever a new top level window is added to the desktop. Step 1300 retrieves the thread and process IDs; then step 1301 determines if this is a new process. If it is not, then Step 1320 looks up its Proc Instance and goes to Step 1321. If it is, then step 1302 gets the name of the file that executes the application, and then step 1303 stores a new entry into Table #6 (FIG. 7) Microsoft Windows™ Operating System(s) properties. Then step 1304 determines if the window is an MDI. If this is the case, step 1305 creates an MDI entry into Table #8 (FIG. 9) properties, and then sets up a notification for the worker thread to watch this window (step 1306). Step 1307 then determines if this application has an auto-deck and if so, then step 1308 updates Table#8 (FIG. 9) properties with the auto-deck ID. Step 1312 checks for an "owner window process", which is an application that controls a set of separate windows through its own internal messaging system. If this is the case, then step 1313 sets up a worker thread notification for this condition.

If this is not an MDI application, step 1314 determines if there are program specific settings that need to be set for this new process. If this is the case, then Step 1309 updates the Table #3 (FIG. 4) instance with the Program ID and Flags. Step 1310 checks to see if Auto Deck Settings are also required and if so Step 1311 Updates the Instance with Auto Deck Settings. Then the process goes to step 1321 for further processing.

If this process already existed, then its Table #6 (FIG. 7) instance is located and then step 1321 determines if this is a new thread. If this is a new thread, then step 1322 creates a Table #7 (FIG. 8) entry and adds this entry to a pointer list. Then step 1323 determines if the process and thread can be hooked to the DLL client and if this is the case step 1324 applies the hook. If it cannot be hooked, then the process is complete at that point (step 1327).

Figure 22:
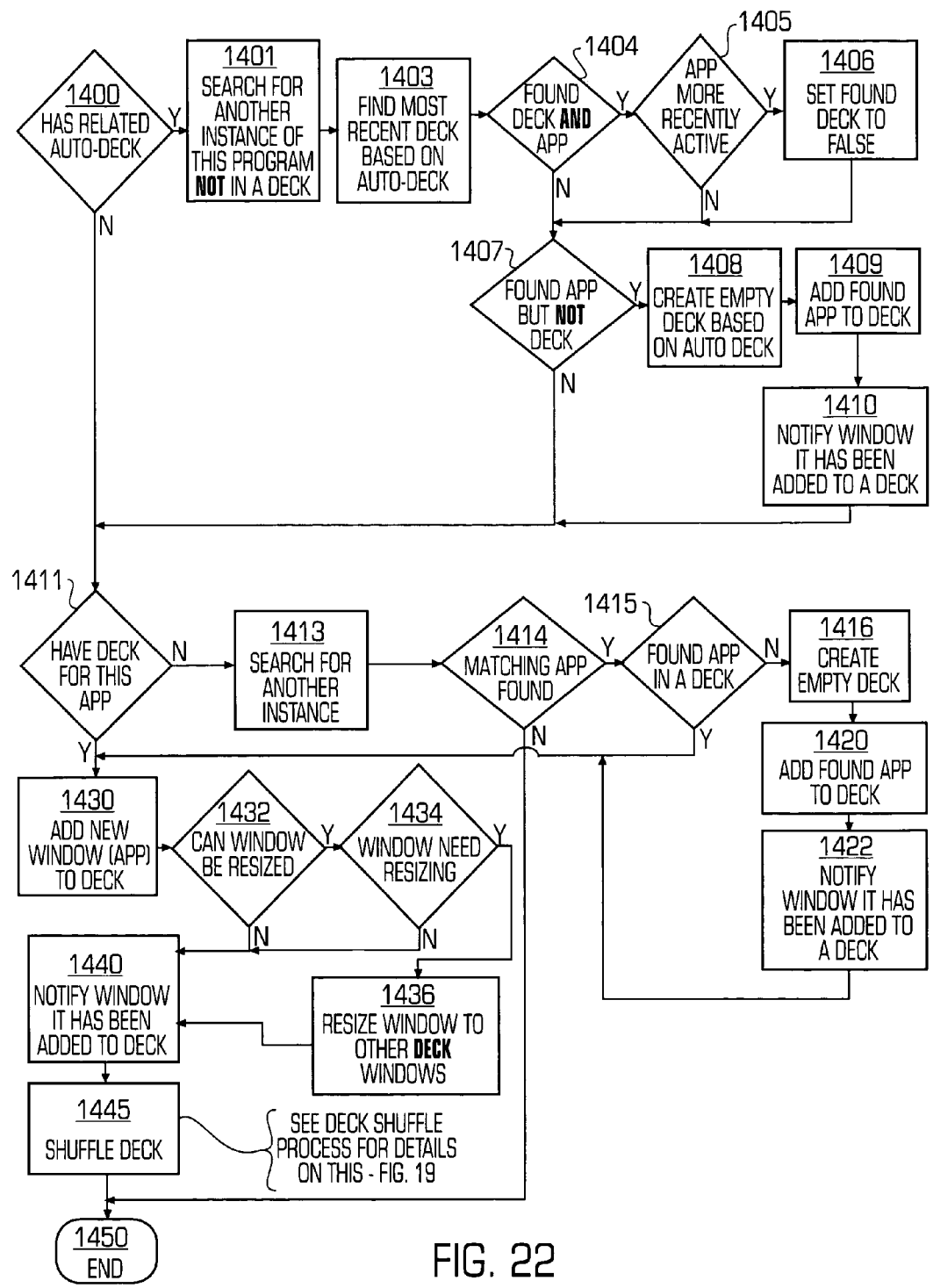
FIG. 22 is an exemplary flow chart that describes a sub-process that takes place in the invention that handles the logic to add a new window into a deck.

Step 1325 then continues with old threads and "hook able" new threads and determines if this new window is "deck able". If this is the case, then the window decking process of FIG. 22 is called (step 1326). At this point the process is complete (step 1327).

FIG. 22 illustrates the logic that is used in the invention whenever a new application is launched onto the desktop. Step 1400 determines if the new application already has a defined auto-deck. If it does, then step 1401 determines if another instance of this application is on the desktop that is not in a deck, and steps 1403 through 1406 picks and sets the most recently active one of the deck and the stand alone application to be used in the decking process. Step 1407 then determines if it is the application that is most recent, and if this is the case, step 1408 creates a new deck. Step 1409 adds the found application to the deck and step 1410 sends a notification to the application that it has been added to the deck.

Step 1411 then determines if a deck has been found for the new application. If not, then step 1413 searches for another application on the desktop that matches the new application. In step 1414, if none is found, the process ends at step 1450. Otherwise, the process proceeds to step 1415, and if the application was in a deck then the process continues at step 1430 below. If the found application was not in a deck, then a new deck is created in step 1416 and the found application is added to the deck in step 1420 and notified in step 1422.

Step 1430 adds the new application into the deck. Step 1432 determines if the window can be resized and if so, step 1434 determines if the window is a different size than the windows already in the deck. If it is, step 1436 resizes the new window to match the windows already in the deck.

Step 1440 sends a notification to the application that the window has been added to the deck. Step 1445 calls the shuffle deck routine to position the deck correctly with the new window added. This completes the process (step 1450).

Figure 20:
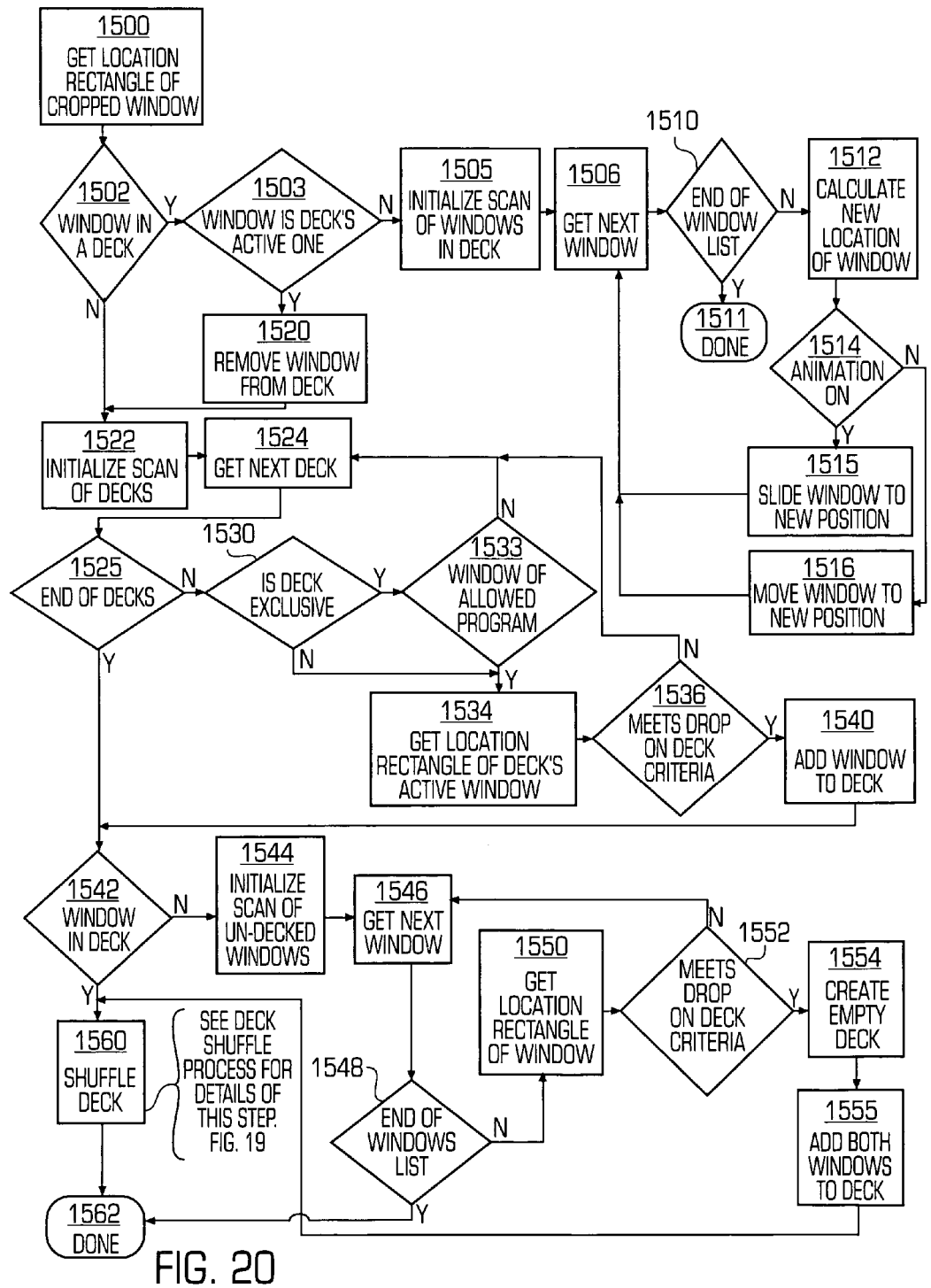
FIG. 20 is an exemplary flow chart that details how the invention detects windows that are dragged and dropped on the desktop. The figure shows three cases that relate to the invention:
1. Adding a window into another window creating a new deck or to an existing deck.
2. Removing the active window from a deck.
3. Moving the entire deck to a new location.

FIG. 20 describes a process that takes place when a window within the GUI is dragged and then dropped into a new location within the desktop. There are five basic possibilities ("cases") that may affect this process whenever this type of event occurs:

1—The active window of an existing deck is moved.

2—A window that was part of an exiting deck but was not the active window is moved.

3—A window that is not in a deck is moved to the decking area of an existing window or deck.

4—A window that in not in a deck is moved to within the decking area of another window that is not in a deck.

5—A window is moved to a position on the desktop that does not meet any of the above criteria.

These are referred to as Cases 1–5 for purpose of explanation as to how the invention determines and treats each situation.

In step 1500, the process determines the location of a dropped window. Steps 1502 and 1503 test if Case 1 is true. If true, step 1520 removes the window from the deck then proceeds to step 1522. This is the beginning of the Case 3 process, since this window could have been removed from one deck and added to another deck in a single drag and drop operation.

The Case 2 process starts on the "no" side of step 1503. In step 1505, the process scans all the windows in the deck. Steps 1506, 1510, and 1512 through 1516 cause the other windows in the deck to be moved to their new locations on the desktop. If animation is on, step 1515 slides the window to its new location. If not, step 1516 moves the window to its new location without animation. Step 1514 decides whether the move should use animation based on the setting of field 265. Once all the windows have been moved then the process is complete in step 1511.

Cases 3–5 begin with step 1522, where the process scans each deck to see if the moved window is within the range of an allowed deck. A deck may be defined as only allowing windows of the same application, as specified in field 170. In this case, the applications must match between the deck and the window that has been dropped. If this is the case, as determined by steps 1530 and 1533, step 1534 checks the location of that deck's active window. Step 136 then determines if the dropped window is within the range to be added to the deck. If this is true, then step 1540 is executed to add the window to the deck. Step 1542 determines if the window was in fact added to a deck. If this is the case, then step 1560 calls the shuffle deck operation to correctly arrange the deck on the desktop. Case 3 is complete in step 1562.

The process tests for Case 4 starting with step 1544, which begins a scan of all un-decked windows. Steps 1546, 1550 and 1552 check the dropped window's location to each un-decked window to determine if the drop criteria is met as defined in field 255. This criteria is the maximum number of pixels the top left corner of the dropped window can be away from each of the possible target windows. If the drop is within the specified pixel range, then the windows are deemed deckable, at which time step 1554 creates a new empty deck. Step 1555 adds both of the windows to this new deck. Then step 1560 is called to shuffle the deck and the operation is complete.

In Case 5, all the windows without a match are scanned. In step 1548, the end of the window list is reached causing the last step 1562 to be executed, finishing the operation without actually doing any deck processing.

Figure 23:
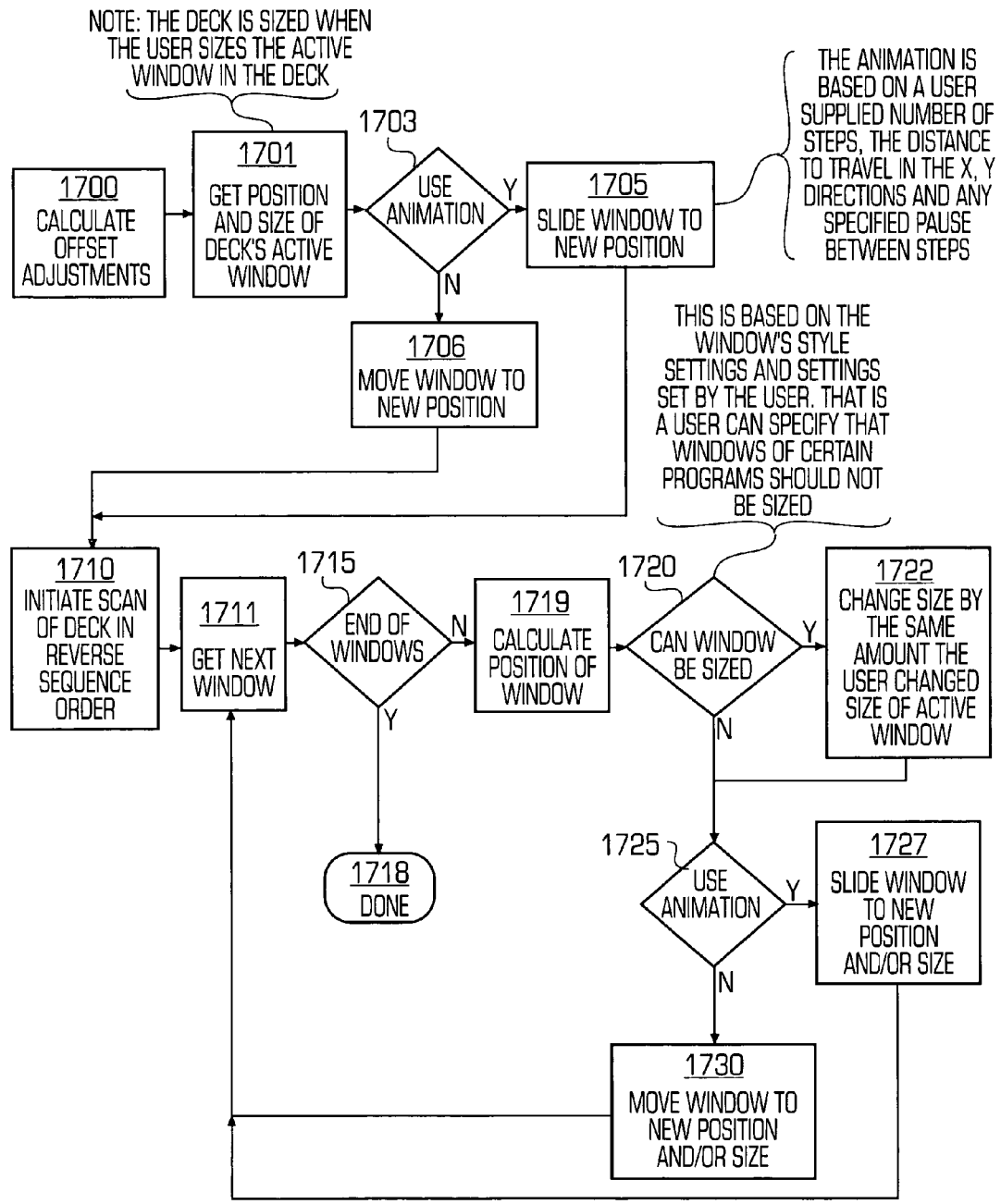
FIG. 23 is an exemplary flow chart describing logic used by the invention whenever a window in a deck is resized.

FIG. 23 shows the flow of automatic window resizing logic. Whenever any window in the deck is resized, then the rest of the windows in the deck are also resized to match the new window's size. The only exception to this is if a window is listed as non-resizable, in which case it is left alone.

Step 1700 calculates the offset adjustments, and step 1701 retrieves the position and size of the deck's active window, which is the new size. Step 1703 decides on whether animation effect is used in the resize. If this is the case, step 1705 slides the window to its new position. If not, step 1706 moves the window to its new position. These previous steps are executed to make sure the active window is on top and that everything is kept neat and organized within the deck.

Step 1710 starts the scan of all the remaining windows that may need to be resized. Step 1711 gets the next window from the deck, working in reverse order. Step 1715 determines if the loop is complete and ends with step 1718 if this is the case. Step 1719 calculates the new position of the window, and step 1720 checks to ensure the window being operated on can in fact be resized. Step 1722 changes the size of this window by the same size factors that the user made to the active window. Step 1725 determines if animation is active in which case the size change is animated in step 1727. If not, the size change is made in one step in step 1730 and then step 1711 is executed again.

It has been determined through initial implementation of the invention using existing popular applications on the market that some applications operate and control their windows using different Windows messages and procedures other than the standards defined by Microsoft. This includes many of Microsoft's own popular applications. To facilitate the integration of such different applications into the invention's framework, the present method uses an integrated set of processes to overcome this potential problem. This will now be described.

Figure 24:
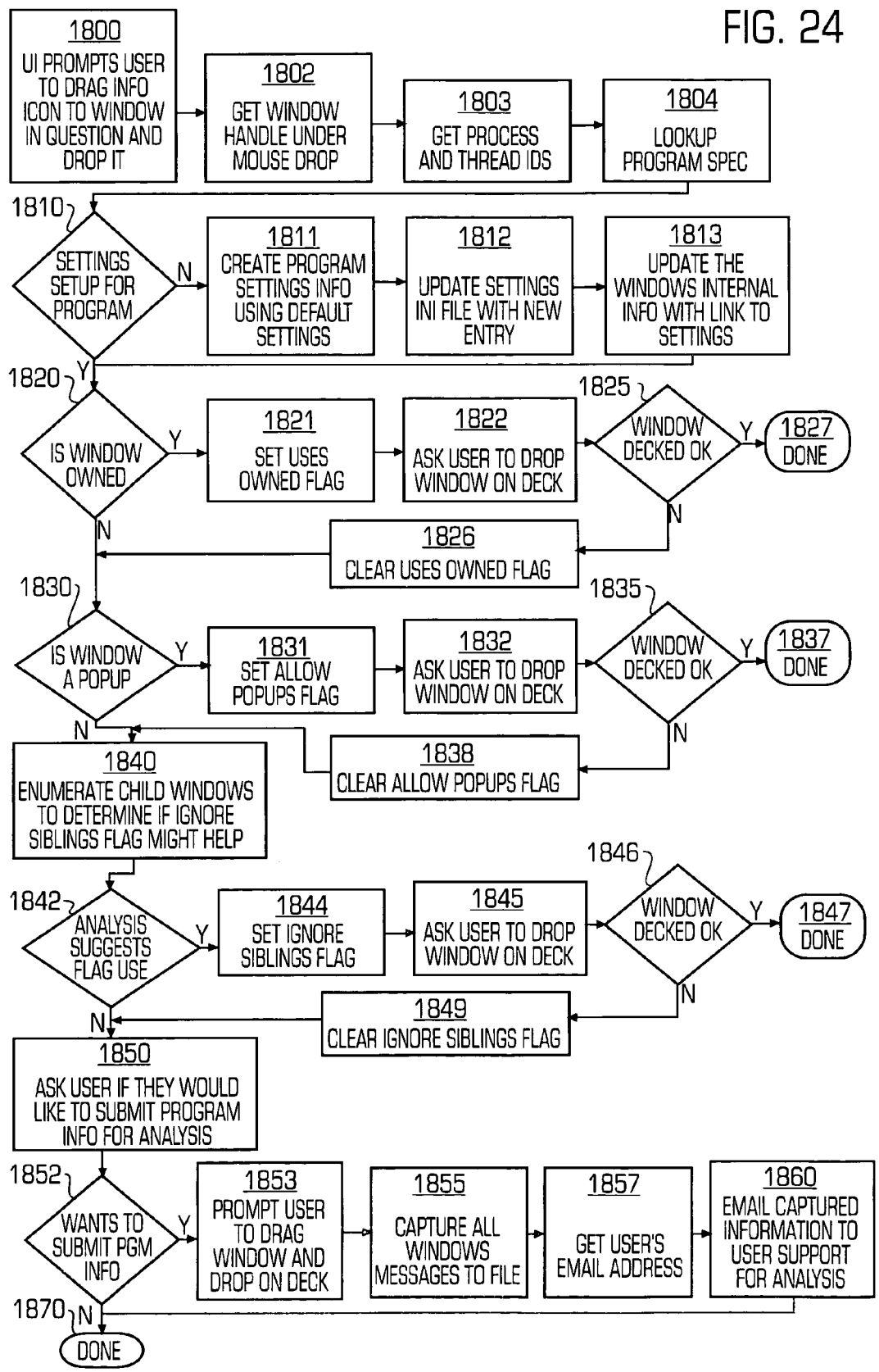
FIG. 24 is an exemplary flow chart describing logic for integrating new applications into a processing framework of the invention.

FIG. 24 illustrates the operational flow of a process for integrating new applications, according to the present invention. Step 1800 starts the process by prompting the user to drag an information icon cursor to the window in question and click on the window. Step 1802 retrieves the window's handle, and step 1803 retrieves the process and thread IDs of the application running the window. Step 1804 then retrieves the program name of the application. Step 1810 determines if a program entry has already been established for this application in the settings file. If this is not the case, the settings files are updated with the program information (steps 1811, 1812), and step 1813 sets up a link for other information to be added in the subsequent steps.

Step 1820 checks for an owned window by setting the owned window flag in step 1821, and then asking the user to attempt to deck the window in step 1822. Step 1825 determines if the deck was successful. If this is the case, the process is done (step 1827). If the application did not deck, then step 1826 clears the owned window flag.

Step 1830 checks for a popup window by setting the popup window flag in step 1831, and then step 1832 asks the user to attempt to deck the window. Step 1835 determines if the deck was successful. If this is the case, then the process is done. If the application did not deck, then step 1836 clears the popup window flag. If the application did deck, the process is done (step 1837).

Step 1840 analyses a child window to see if the ignore siblings flag would help deck the window. Step 1842 checks the result of this analysis. If it is positive, then the ignore siblings flag is set in step 1844. Then the user is asked to attempt to deck the window in step 1845. Step 1846 determines if the deck was successful and if this is the case then the process is done (step 1847). If the application did not deck, then step 1849 clears the ignore siblings flag.

At this point we should note that the invention is not limited to the above-described checks and determinations, but as other types of windows become exposed to the application, then other checks and determinations can also be added. It will be apparent to those skilled in the art based upon the foregoing description as to the nature and manner in which such checks may be implemented and performed.

If none of the checks results in the application decking, then the user is prompted in step 1850, if he would like to submit the application for analysis to a remote programming analysis facility. In step 1852, if the answer is yes, the process proceeds to step 1853 and prompts the user to attempt to deck the window one last time. Step 1855 then captures all of the windows messages to a file. Step 1857 asks for the user's email address and step 1860 emails all the information to our support center for analysis. The process is then complete (step 1870).

Based upon the foregoing description and drawings, it will be apparent to those skilled in the art that well know programming techniques may be employed to create software for various computer architectures on which the invention is implemented. Moreover, while the invention has been described with reference to a particular embodiment and in connection with conventional Microsoft Windows™ operating systems, it will likewise be apparent to those skilled in the art that the invention has greater utility and may be implemented on other GUI-based systems having different architectures and running different operating systems.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. method for managing a plurality of windows displayed on a personal computer, comprising:
    arranging the plurality of windows into a deck of cascaded windows, including one active window that resides at the front of the deck and one or more inactive windows cascaded behind the active window, wherein each of the windows includes a visible title bar, and wherein the windows are operatively linked together;

automatically causing the title bar of each window within the deck to remain visible regardless of which window in the deck is active; and automatically shuffling the deck when any inactive window is selected, wherein the selected window is automatically activated and fills the space of the previously active window at the front of the deck, and wherein previously active windows are automatically moved to another position in the deck, wherein all title bars are visible within the deck.

2. The method of claim 1 further comprising: automatically removing a window from the deck when the window is activated and dragged away from the deck.

3. The method of claim 2 further comprising:
automatically adding a window to the deck when the window is dragged onto the deck.

4. The method of claim 1 further comprising:
assigning an auto-deck property to an application;
detecting when the application is launched;
determining whether the application is in the deck; and
adding a window to the deck for the application if the application is in the deck.

5. The method of claim 4 further comprising:
creating a new deck if the application is not in the deck.

6. The method of claim 1 further comprising:
detecting when a window in the deck is resized; and
automatically resizing all other windows in the deck to the new size.

7. A computer-readable medium having computer-executable instructions for performing a method for managing a plurality of windows displayed on a computer, the method comprising:

arranging the plurality of windows into a deck of cascaded windows, including one active window that resides at the front of the deck and one or more inactive windows cascaded behind the active window, wherein each of the windows includes a visible title bar, and wherein the windows are operatively linked together;

automatically causing the title bar of each window within the deck to remain visible regardless of which window in the deck is active; and automatically shuffling the deck when any inactive window is selected, wherein the selected window is automatically activated and fills the space of the previously active window at the front of the deck, and wherein previously active windows are automatically moved to another position in the deck, wherein all title bars are visible within the deck.

8. The computer-readable medium of claim 7, wherein the method further comprises:
removing a window from the deck when the window is activated and dragged away from the deck.

9. The computer-readable medium of claim 7, wherein the method further comprises:
automatically adding a window to the deck when the window is dragged onto the deck.

10. The computer-readable medium of claim 7, wherein the method further comprises:
assigning an auto-deck property to an application;
detecting when the application is launched;
determining whether the application is in the deck; and
adding a window to the deck for the application if the application is in the deck.

11. The computer-readable medium of claim 7, wherein the method further comprises:
creating a new deck if the application is not in the deck.

12. The computer-readable medium of claim 7, wherein the method further comprises:
detecting when a window in the deck is resized; and
automatically resizing all other windows in the deck to the new size.

13. A data processing system for use on a computer comprising:

cascade logic for arranging a plurality of windows into a deck of cascaded windows, including one active window that resides at the front of the deck an one or more inactive windows cascaded behind the active window, wherein each of the windows includes a visible title bar, and wherein the windows are operatively linked together;

display logic for automatically causing at the title bar of each window within the deck to remain visible regardless of which window in the deck is active; and shuffle logic for automatically shuffling the deck when any inactive window is selected, wherein the selected window is automatically activated and fills the space of the previously active window at the front of the deck, and wherein previously active windows are automatically moved to another position in the deck, wherein all title bars are visible within the deck.

14. The system of claim 13, wherein the cascade logic is further adapted to remove a window from the deck when the window is activated and dragged away from the deck, and add a window to the deck when the window is dragged onto the deck.

15. The system of claim 13 further comprising:
auto-deck logic that is adapted to:
assign an auto-deck property to an application;
detect when the application is launched;
determine whether the application is in the deck; and
add a window to the deck for the application if the application is in the deck.

16. The system of claim 15, wherein the auto-deck logic is further adapted to create a new deck if the application is not in the deck.

* * * * *